F. WIEBENS.
LUBRICATOR.
APPLICATION FILED SEPT. 10, 1909.
997,724.
Patented July 11, 1911.
2 SHEETS—SHEET 1.
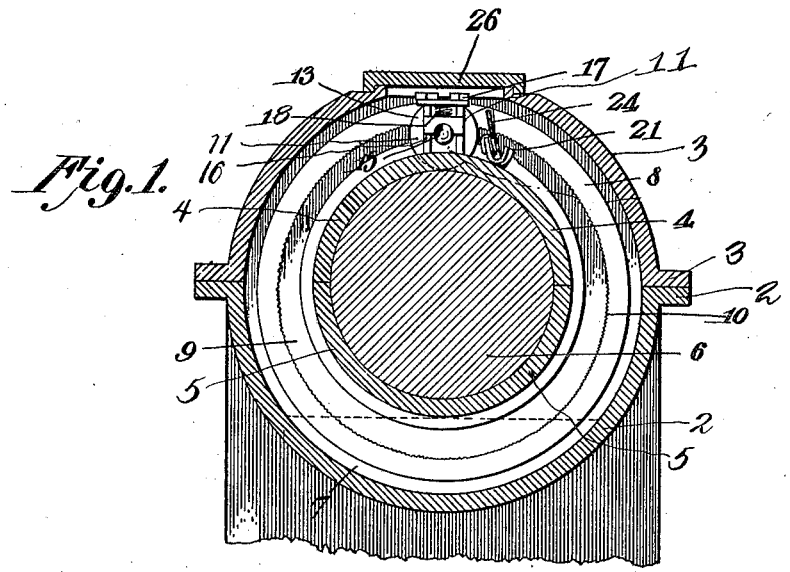
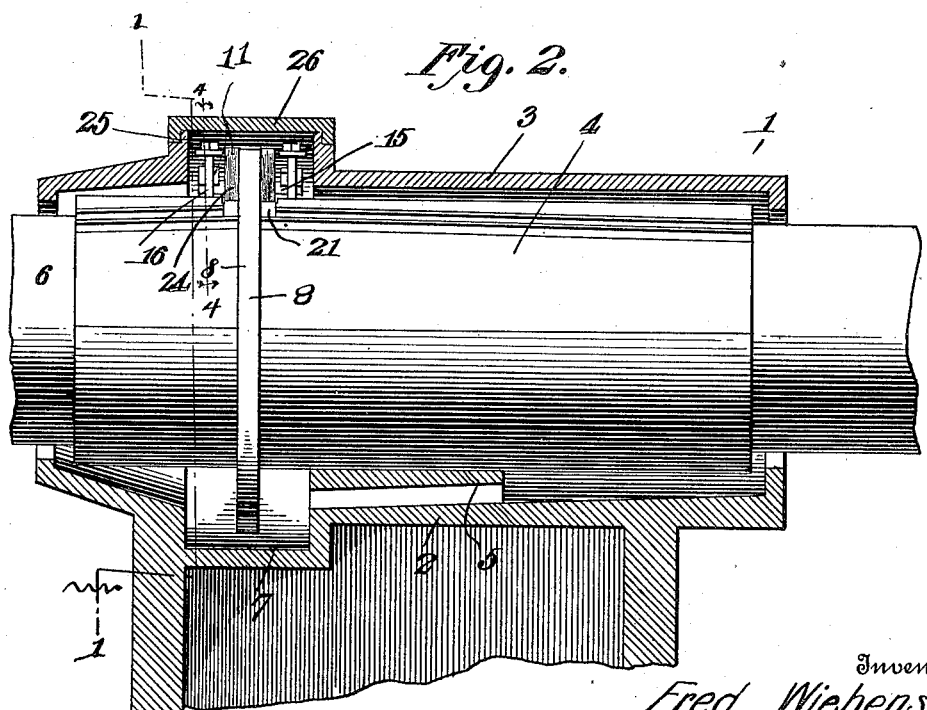
Witnesses
Inventor
Fred Wiebens,
By Victor J. Evans.
Attorney F. WIEBENS.
LUBRICATOR.
APPLICATION FILED SEPT. 10, 1909.
997,724.
Patented July 11, 1911.
2 SHEETS—SHEET 2.
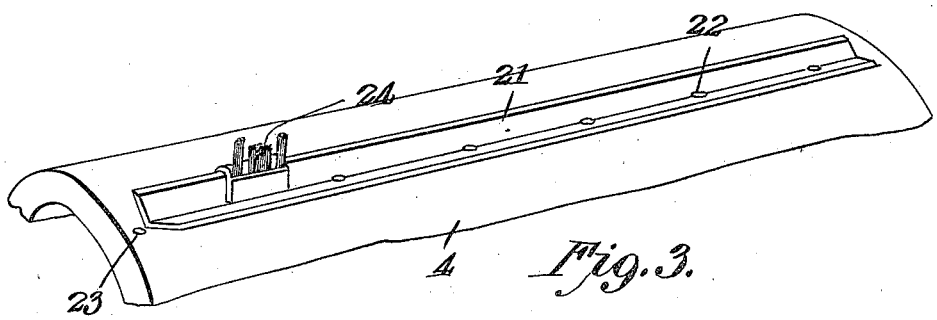
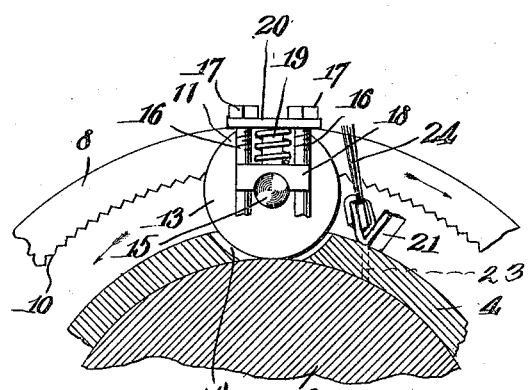
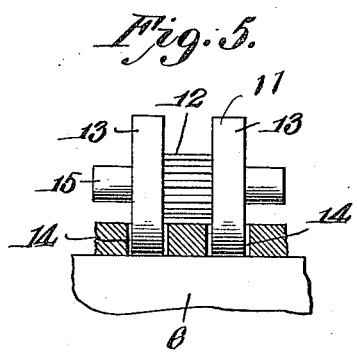
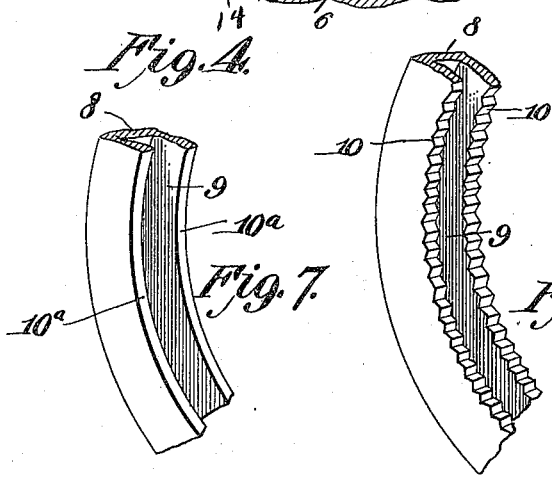
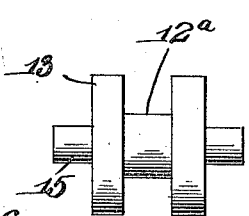

UNITED STATES PATENT OFFICE.

FRED WIEBENS, OF SAN DIEGO, CALIFORNIA.

LUBRICATOR.

997,724.  Specification of Letters Patent.  Patented July 11, 1911.

Application filed September 10, 1909. Serial No. 517,122.

*To all whom it may concern:*

Be it known that I, FRED WIEBENS, a citizen of the United States, residing at San Diego, in the county of San Diego and State of California, have invented new and useful Improvements in Lubricators, of which the following is a specification.

This invention relates to an automatic lubricator for the journal bearings of motors, generators, steam and water turbines and other heavy and high speed machines.

It has been common heretofore to employ a lubricator in the form of a flat ring driven by direct frictional contact with the axle or journal to take up oil from an underlying well and deliver it to the bearing surfaces. Such a type of lubricator has been found inefficient for heavy and high speed machines having lengthy bearings, on account of the limited amount of oil taken up by the ring, the restricted portion of the bearing surface supplied thereby and the tendency of the ring to slip, whereby its feed action is impaired, especially in the use of heavy oils, owing to the resistance opposed by the oil to the movement of the ring. It has been proposed to employ a series of such rings arranged at spaced intervals to feed the oil to different portions of a lengthy bearing, but this arrangement has been found inefficient particularly in the lubrication of high speed machines for the reasons above stated.

The main object of the present invention is to provide a lubricator which will be positively driven and will elevate the oil from the well to a position above the bearing, from which it will be supplied to different portions of the bearing by gravity, thus insuring thorough and efficient lubrication along the entire length of the bearing.

A further object of the invention is to provide a feed ring and means for positively driving the same from the journal or axle, whereby any tendency of the ring to slip will be overcome and a positive and regulated feed action thereof secured.

A still further object of the invention is to provide a construction of ring to feed a maximum amount of oil, to provide a construction of driving means so that the ring may be employed for positively feeding oils of any degree of density or viscosity, and to provide simple and effective means for collecting the oil from the ring and distributing it by gravity to different portions of the bearing, so that the use of but a single feed ring will be required to effectually lubricate a bearing of any ordinary length.

With these and other objects in view, the invention consists of the features of construction, combination and arrangement of parts hereinafter described, and claimed, reference being had to the accompanying drawings, in which:—

Figure 1 is a vertical transverse section through a bearing embodying my invention taken on the plane indicated by the line 1—1 of Fig. 2. Fig. 2 is a vertical longitudinal section of the same. Fig. 3 is a fragmentary perspective view of the upper bearing brass showing the oil distributing means. Fig. 4 is a cross section on the line 4—4 of Fig. 2. Fig. 5 is a detail longitudinal section showing the construction of the driving wheel or gear. Fig. 6 is a fragmentary perspective view of the feed ring. Figs. 7 and 8 are views showing a modified construction of feed ring and driving wheel.

Referring to the drawings, the numeral 1 designates the bearing casing, comprising the bearing base 2 and usual cap 3, the upper and lower bearing brasses 4 and 5, and the shaft or axle spindle 6 journaled in the brasses. The bearing base 2 is provided with an oil well or reservoir 7.

An oil feed ring 8 extends transversely within the casing and around the brasses 4 and 5 and moves at its lower portion through the well 7. This ring is of hollow or channeled form and its flanges 9 are provided with gear teeth 10. The upper portion of the ring engages and is driven by a drive gear or wheel 11 comprising a hub 12 and spaced disks or flanges 13, said hub being of smaller diameter than the flanges to provide an annular groove between the latter to receive the ring and hold the same against lateral displacement.

As shown, the hub 12 is toothed to engage the teeth 10 of the ring to impart a positive driving action to the ring, and the flanges 13 project through openings 14 in the upper bearing brass 4 to frictionally engage the surface of the journal 6, through which frictional engagement the driving wheel is rotated at a less rate of speed than the journal and acts as a reducing gear to transfer a corresponding less rate of speed to the ring. The wheel is mounted upon a shaft or axle 15, the ends of which are slidable vertically in guideways formed by pairs of spaced posts or guide pins 16, fastened at their lower ends to the upper brass 4 and threaded at their upper ends to receive retaining nuts 17. Each end of the axle engages a bearing plate or member 18 recessed at its ends to slidably engage the adjacent posts and yieldingly held in contact with the axle by a superposed spring 19 arranged between the same and a cap or head plate 20 slidably mounted on the posts and adjustable by means of the nuts 17 to vary the pressure of the spring on the bearing. By this construction of adjustable spring pressed bearing, the frictional engagement between the flanges of the driving wheel and the journal may be regulated to secure a driving action and prevent the wheel from slipping.

Extending longitudinally of and suitably secured to the upper brass 4 in rear of the driving wheel in the direction of revolution of the feed ring which turns in the reverse direction to the shaft 1, as indicated by the arrows in Fig. 4, is a distributing trough, gutter, channel or conductor 21 provided at suitable intervals along its length with feed ports or passages 22 registering with similar ports or passages 23 in the brass 4 for the feeding of oil from the trough to different portions of the bearing along the length thereof. Rising from the side of said trough adjacent the driving wheel and in rear of the latter is a wiper 24, preferably comprising a brush of bristle or other suitable material extending transversely of the inner face of the feed ring 8 and arranged to engage the inner surfaces of said ring and both the inner and outer edges of the flanges 9. The cap 3 is provided with a pocket or enlargement 25 to accommodate and expose the driving wheel and adjacent parts, which pocket may be normally closed by a cover 26 to prevent access of dust and dirt.

In the operation of the device, it will be apparent that as the axle 6 revolves, motion will be communicated to the driving wheel 11, which in turn will impart rotary motion to the feed ring 8, which is positively driven thereby at a less rate of speed than the axle, thus adapting the ring to be efficiently employed in connection with a high speed axle or spindle without liability of injury or of being thrown out of operative position by centrifugal force as would be the case under some conditions in the use of a ring driven by direct contact with an axle revolving at high speed. The lower portion of the ring passing through the oil well 7 normally contains a body of the oil, a portion of which is carried up by the ring within the hollow body thereof due to centrifugal force and the adherence of the oil to the surfaces of the ring. As a result, a certain amount of oil will be elevated by the ring on each revolution thereof, and this oil will be removed or wiped off the surfaces thereof, by the brush 24 and will flow into the distributing channel or conductor 21, from which it will feed by the action of gravity to different portions of the bearing, keeping the same thoroughly and constantly lubricated so that no portion of the bearing can run dry irrespective of the rate of speed at which the axle may be driven. The oil flowing downward around the bearing surfaces finally discharges into the bearing base and is returned to the cup 7 for further use.

From the foregoing description, it will be seen that by making the feed ring of hollow or channeled form, a larger amount of surface is presented for the collection and adherence of the oil, the channel of the ring holding the oil therein which is raised to the wiper and distributer due to the centrifugal action set up by the motion of the ring and the adhesion of the liquid thereto, so that a greater amount may be supplied on each revolution thereof than by the use of a flat ring of ordinary construction. Also it will be seen that by positively driving the feed ring, a regulated and uniform motion thereof is secured and slippage of the ring prevented, so that it may be employed for effectually feeding light and heavy oils with equal facility. By the provision of the distributing means disclosed in connection with the ring the oil will first be elevated to a point above the bearing and then caused to flow by gravity to different portions along the length of the bearing, insuring a positive feed with attendant advantages over a method of simply bringing portions of oil by a wiping contact against the surface of the bearing, as in the use of the ordinary flat rings. In practice the feed ring will supply sufficient oil to maintain a predetermined amount in the distributing channel, so that but a single feed ring need be employed to supply an adequate amount of oil to keep the bearing lubricated along its entire length.

The driving wheel is preferably snugly fitted on its axle 15 so that when worn it may be detached in an obvious manner and a new one applied in its place. It will be understood that the open pocket 25 affords access to the wheels for this purpose and also to the nuts 17 to conveniently regulate the pressure of the spring 19.

On certain classes of bearings a feed ring and driving axle without teeth or cogs, or having friction driving surfaces 10ª and 12ª, as shown in Figs. 7 and 8, may be used, the weight of a heavy channeled ring being sufficient to insure ample frictional contact for driving action when light oil is used. By using wheels with hubs or driving surfaces of different diameters the speed of the ring may be regulated as desired. As a result of my invention the oil will be raised above the brasses and distributed to all parts of the bearing by gravity and the feed of the oil controlled to supply an adequate amount for effective lubrication.

I claim :—

1. The combination of a bearing, an axle journaled therein, a channeled ring for elevating oil from a position below to a position above the journal, a wiper operative to engage and remove the oil from the inner surface of the body of the ring and inner and outer surfaces of the flanges thereof, and means for feeding the elevated oil by gravity to the journal at different points along the length thereof.

2. The combination of a bearing provided with an oil well at the bottom thereof, an axle journaled in said bearing, a rotating ring surrounding the axle for elevating oil from the well, an interposed speed reducing driving element for positively driving the ring at reduced speed from the rotating axle, a wiper operative to engage and remove the oil from the surface of the ring, and means for distributing the oil to the bearing surfaces.

3. The combination of a bearing provided with an oil well at the bottom thereof, an axle journaled in said bearing, a rotating ring surrounding the axle for elevating oil from the well, a speed reducing gear driven by the axle and arranged to transmit therefrom positive motion at a reduced rate of speed to the ring, and means for distributing the oil from the ring to the bearing surfaces.

4. The combination of a bearing provided with an oil well at the bottom thereof, a toothed channeled ring surrounding the axle for elevating oil from the well, a gear driven by frictional contact with the axle and having teeth meshing with the toothed ring to positively drive the same, a wiper operative to engage and remove the oil from the inner surfaces of the body of the ring and inner and outer surfaces of the flanges thereof, and means for distributing the oil to the bearing surfaces.

5. The combination of a bearing provided with an oil well at the bottom thereof, an axle journaled in said bearing, a channeled ring surrounding the axle for elevating oil from the well, such ring having its flanges provided with gear teeth, a friction gear driven by the axle and provided with teeth meshing with the teeth of the ring to impart a positive driving action thereto, a wiper arranged to remove the oil from the inner surface of the body of the ring and from the inner and outer surfaces of the flanges of the ring, and means for distributing the oil to the bearing surfaces.

6. The combination of a bearing provided with an oil well, an axle journaled in the bearing, a channeled ring surrounding the axle for feeding oil from the well, a drive wheel frictionally engaging the axle and having spaced flanges receiving and engaging the side flanges of the ring and the hub in driving engagement with said flanges of the ring, a conductor communicating with the bearing at different points along its length, and means for removing the oil from the ring for feed to said conductor.

7. The combination of a bearing provided with an oil well at the bottom thereof, a rotating channeled ring for elevating oil from the well, means for positively driving the ring from the rotating axle, a conductor communicating with the bearing at different points along its length, and a wiper arranged to engage the inner surfaces of the ring and inner and outer faces of the flanges of said ring, remove the oil and feed the same to said conductor.

8. The combination of a bearing provided with an oil well at the bottom thereof, an axle journaled in said bearing, a channeled rotating ring for elevating oil from the well, said ring having its side flanges provided with gear teeth, a flanged gear driven by the axle and meshing with the toothed flanges of the ring to impart positive motion thereto, a conductor communicating with the bearing at different points along its length, and a wiper arranged to engage the inner surface of the ring and inner and outer faces of the flanges thereof to remove the oil therefrom and feed the same to said conductor.

9. The combination of a bearing provided with an oil well at the bottom thereof, an axle journaled in said bearing, a channeled ring for elevating oil from the well, said ring having its flanges provided with gear teeth, a friction gear driven by the axle and provided with teeth meshing with the teeth of the ring to impart a positive driving action to the latter, a conductor communicating with the bearing at different points along its length, and a wiper arranged to remove the oil from the ring and feed the same to said conductor.

10. The combination of a bearing provided with an oil well at the bottom thereof, an axle journaled in said bearing, a channeled ring for elevating oil from the well, said ring having its flanges provided with teeth, a friction gear driven by the axle and having teeth meshing with the teeth of the ring to impart a positive driving action to the latter, a conductor communicating with the bearing at different points along its length, and a wiper arranged to remove the oil from the ring and feed the same to said conductor.

In testimony whereof I affix my signature in presence of two witnesses.

FRED WIEBENS.

Witnesses:
C. C. HINES,
D. B. GALT.

Copies of this patent may be obtained for five cents each, by addressing the "Commissioner of Patents, Washington, D. C."